United States Patent [15] 3,647,329
Reifenhauser et al. [45] Mar. 7, 1972

[54] APPARATUS FOR THE EXTRUSION OF CELLULAR SYNTHETIC RESINS

[72] Inventors: Fritz Reifenhauser; Hans Reifenhauser, both of Troisdorf; Klaus Burggraf, Sieglar, all of Germany

[73] Assignee: Reifenhauser KG, Troisdorf, Germany

[22] Filed: Aug. 4, 1969

[21] Appl. No.: 847,085

[30] Foreign Application Priority Data

Aug. 3, 1968 Germany ..................P 17 79 374.7

[52] U.S. Cl. ..................................425/4, 264/54, 264/55, 264/89, 425/363, 425/817
[51] Int. Cl. ..........................................B29d 27/00
[58] Field of Search ................18/1 F, 4 S, 4 B, 19 TM, 12 F, 18/12 TF, 5 F, 5 P, 9; 264/53, 89, 348, 54, 55

[56] References Cited

UNITED STATES PATENTS 2,401,642 6/1946 Hiltner ..............................264/348 X
3,119,147 1/1964 Kracht ...............................18/1

*Primary Examiner*—J. Spencer Overholser
*Assistant Examiner*—Norman E. Lehrer
*Attorney*—Karl F. Ross

[57] ABSTRACT

Apparatus for the extrusion of cellular (foamed) synthetic resins and elastomers in which a masticated and plastified synthetic resin or elastomer mixture, blended with a foaming agent, is extruded through a nozzle, e.g., in the form of slab. The extruded slab is permitted to expand against a superatmospheric counterpressure during cooling in one or more chambers provided immediately ahead of the extrusion nozzle, the chambers being separated from one another by pressure-retaining gates or locks. Between each chamber, a driven or autorotating pair of calibrating rolls may form part of the pressure-retaining gate.

3 Claims, 2 Drawing Figures

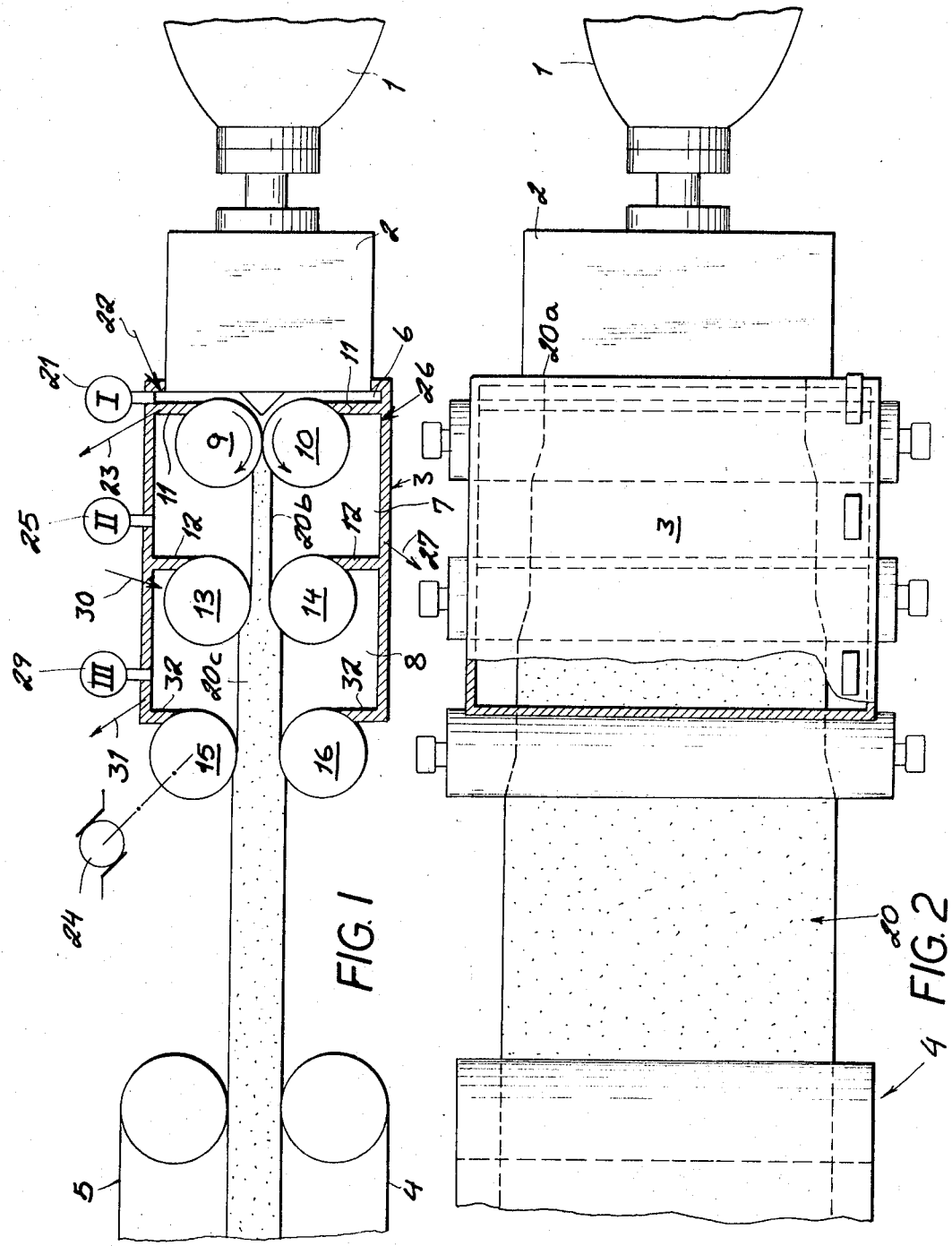

ically dimensioned slabs sheets or layers of such materials.

APPARATUS FOR THE EXTRUSION OF CELLULAR SYNTHETIC RESINS

FIELD OF THE INVENTION

Our present invention relates to an apparatus for the extrusion of cellular or foamed synthetic resins and elastomers and, more particularly, to a system for the formation of precisely dimensioned slabs sheets or layers of such materials.

BACKGROUND OF THE INVENTION

It is a common practice in the formation of synthetic-resin bodies and especially flexible or rigid cellular or foamed synthetic resins (thermoplastics) and elastomers, to form an expanding mixture of the thermoplastic base material in a plastification and mastication assembly by incorporating in the thermoplastic, a foaming agent or providing in homogeneous dispersion therein, an agent capable of generating gas upon extrusion of the mixture through a nozzle.

The foaming agent may be a gas or a liquid which is intimately blended with the thermoplastic material and/or dissolved therein at the pressure developed during mastication and capable of expanding against atmospheric pressure at the extrusion temperatures, i.e., a substance (generally a fluid) having a vapor pressure at the extrusion temperature in excess of atmospheric pressure or a boiling point below the extrusion temperature.

It has also been proposed to provide foaming or expanding agents which operate by chemical reaction to produce gas upon extrusion. It may be noted at this point that the present invention relates to all such systems for thermoplastic materials and forming cellular bodies with open or closed pores.

In connection with the formation of slabs, plates or layers of such materials, it has been the practice heretofore to permit the extruded sheet to expand against ambient (atmospheric) pressure and thereafter impart the desired dimensions and density to the slab by passing the latter through one or more sets of calendering rolls in a separate operation. Such arrangements are expensive and, since they operate upon a fully expanded slab, frequently do not achieve the desired results in terms of imparting precise dimensions to the slab.

OBJECT OF THE INVENTION

It is, therefore, the principal object of the present invention to provide an improved method and an improved apparatus for the formation of extruded cellular bodies of the aforementioned character which are free from the above-mentioned disadvantages and have precisely controllable dimensions.

SUMMARY OF THE INVENTION

This object and others, which will be apparent hereinafter, are achieved, in accordance with the present invention, by a system for the extrusion of slabs of expandable synthetic resin, i.e., a masticated and plastified thermoplastic mixture containing an expanding agent, wherein the slab is extruded through a nozzle directly into a pressure chamber in which a counterpressure above atmospheric is maintained and at least an initial cooling of the slab is carried out to limit expansion of the slab.

According to a more specific feature of this invention, two or more chambers are provided in succession between the nozzle and the atmosphere and expansion of the continuously extruded body traversing these chambers is effected in two or more stages. By controlling the pressure, it is possible to precisely dimension the body and carefully regulate the degree of expansion.

An important aspect of this invention resides in the cooling of the thermoplastic body prior to emergence from the last pressure chamber to the point at which further expansion cannot occur.

Still another feature of this invention resides in the provision of precisely calibrated gaps at the inlet side of the first pressure chamber, between successive pressure chambers and at the outlet side of the final pressure chamber, thereby assuring the precise dimensioning of the body. In accordance with this feature, we provide pressure-retentive locks or gates between the pressure chambers and at the inlet and outlet sides of the first and last chambers which function as the calibrated slots or openings through which the continuously extruded body passes.

More specifically, these slots can be designed between sets of calibrating rolls which also form part of the pressure-retentive gates, although it is obvious that simple calibrating openings without such rolls may be provided. When the rolls are used, they may be driven to provide a calendering effect or may be autorotating, i.e., rotated by the continuous extruded body as its drawn between the rolls. The fluid circulated through the pressure chambers, to maintain the desired pressure levels, may also serve as the cooling medium in contact with which the extruded body solidifies.

The system described above thus affords the ability of controlling foamed thermoplastics within narrow limits to impart desired dimensions to them with small tolerances and eliminates separate processing of preformed extruded bodies in calendering-roll arrangements or the like.

DESCRIPTION OF THE DRAWING

The above and other objects, features and advantages of the present invention will become more readily apparent from the following description, reference being made to the accompanying drawing in which:

FIG. 1 is a diagrammatic sectional view through an apparatus, according to the present invention; and FIG. 2 is a plan view thereof.

SPECIFIC DESCRIPTION

In the drawing, we have shown an arrangement which comprises a plastified or masticating worm assembly 1 of conventional construction which thoroughly blends under pressure and usually with temperature elevation, a thermoplastic mass (e.g., polystyrene) to which an expanding agent (e.g., a hydrocarbon, a fluorocarbon or carbon dioxide) has been added to form a flowable, expandable thermoplastic blend which is extruded through an extrusion nozzle or die 2, here having a slotlike opening designed to form a slab 20.

According to the present invention directly ahead of the nozzle or die 2, i.e., without an intervening gap open to the atmosphere, is provided a pressure chamber 6 maintained at a superatmospheric pressure just above or slightly below the vapor pressure of the expanding agent at the extrusion temperature. A pressure gauge 21 serves to indicate the pressure and fluid circulated through the chamber 6 is provided and is represented by arrows 22 and 23. Consequently, substantially no significant expansion of the extruded sheet 20a, emerging from the nozzle, occurs.

The chamber 6 is formed in a housing 3 which is mounted upon the nozzle or die 2 and constitutes a calibrating device for controlling the thicknesses of the slab. The first slab 20 is drawn from the calibrating device 3 between a pair of conveyor bands 4 and 5 so that the rolls of the calibrating devices need not be driven although motors may be provided as represented at 24 for operating these rolls.

Immediately ahead of the first stage pressure chamber 6, there is provided within the housing of the calibrating device 3, a second pressure chamber 7 which is maintained at a slightly lower pressure (II) as indicated by the gauge 25 and is supplied with the cooling and pressurizing gas (e.g., air) as represented at 26 and 27.

Between the pressure chambers 6 and 7, there is provided a pressure lock or gate in the form of a pair of walls 11 which sealingly bear against the surfaces of a pair of initial calibrating rolls 9 and 10, the latter squeezing the sheets between them.

Within chamber 7, the slab portion 20b expands to a greater thickness (FIG. 1) precisely determined by the pressure within this chamber and is passed thereafter through a gate formed by the walls 12 and the rolls 13 and 14, into the next chamber 8.

At the exit side of this chamber, which has a pressure gauge 29 and is supplied with cooling fluid as represented by the arrows 30 and 31 to maintain a slightly lower pressure above atmospheric, there is provided the final pair of rolls 15 and 16 cooperating with walls 32 to form the final pressure gate. The slab, which expands further at portion 26 in chamber 8, passes between rolls 15 and 16 but is now in a fully hardened or cooled state so that no further expansion may occur except for the slight expansion which results when the external pressure on the slab is relieved. A precise dimensioning of the slabs has been found to be possible with this device.

SPECIFIC EXAMPLE

Polystyrene, which contained no blowing agents, was supplied with 1.4 percent of sodium bicarbonate and 1.6 percent of sodium citrate while it was fed into the hopper of the extruder. The mixture was then heated to 176° C. while it flowed through the extruder. In the path of molten polystyrene 7 percent of pentane was added under 11 kg./cm.$^2$ pressure continuously to be well mixed with the molten polystyrene, and the mixture was cooled at 127° C. and then heated at 121° C. The heated mixture was then extruded through the die into a first chamber at a pressure of 10 kg./cm.$^2$ (gauge), a second chamber at 5 kg./cm.$^2$ (gauge) and a third chamber at 1 kg./cm.$^2$ (gauge) prior to emergence into the atmosphere at a temperature of about 80° C.

We claim:

1. An apparatus for the extrusion of a foamed thermoplastic synthetic resin comprising an extrusion press having an extrusion die for extruding a continuous body of foamable thermoplastic synthetic resin; housing means sealingly connected to said die and defining a plurality of chambers immediately ahead of said die and successively traversed by said body, said chambers including a first pressure chamber extending from said die and second and third pressure chambers successively downstream of said first chamber; pressure-control means connected to each of said chambers for adjusting the pressure therein to control the expansion of said body; and a pressure-retentive gate formed in said housing means between a pair of successive chambers, said gate comprising a partition wall formed on said housing means on opposite sides of said body and extending toward said body but terminating short of respective surfaces of said body to define gaps therewith, and respective rolls journaled in said housing means and sealingly obstructing said gaps while rollingly engaging said body for calibrating same.

2. The apparatus defined in claim 1, further comprising a further pair of calibrating rolls defining an outlet gate in said housing means and engaging said body for calibration thereof upon feeding said body out of said housing means.

3. The apparatus defined in claim 1, further comprising a pair of calibrating rolls immediately adjacent said die and sealingly engaging said body upon entry thereof into said housing means.

* * * * *